US012000356B2

(12) United States Patent
Mook et al.

(10) Patent No.: US 12,000,356 B2
(45) Date of Patent: Jun. 4, 2024

(54) ENGINE APPARATUS AND METHOD FOR OPERATION

(71) Applicant: Hyliion Holdings Corp., Cedar Park, TX (US)

(72) Inventors: Joshua Tyler Mook, Loveland, OH (US); Kevin Michael VandeVoorde, Cincinnati, OH (US); Aigbedion Akwara, Cincinnati, OH (US); Michael Robert Notarnicola, Cincinnati, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 0 days.

(21) Appl. No.: 18/161,523

(22) Filed: Jan. 30, 2023

(65) Prior Publication Data

US 2023/0175456 A1 Jun. 8, 2023

Related U.S. Application Data

(63) Continuation of application No. 17/528,683, filed on Nov. 17, 2021, now Pat. No. 11,566,582, which is a continuation of application No. 16/788,402, filed on Feb. 12, 2020, now Pat. No. 11,193,449, which is a (Continued)

(51) Int. Cl.
*F03G 1/04* (2006.01)
*F02G 1/044* (2006.01)

(52) U.S. Cl.
CPC .................................... *F02G 1/044* (2013.01)

(58) Field of Classification Search
CPC ...... F02G 1/0435; F02G 1/05; F02G 2280/10; F02G 2244/50
See application file for complete search history.

(56) References Cited

U.S. PATENT DOCUMENTS

| | | | |
|---|---|---|---|
| 2,480,525 | A | 8/1949 | Van Weenen |
| 2,616,245 | A | 11/1952 | Van Weenen |
| 3,296,808 | A | 1/1967 | Malik |

(Continued)

OTHER PUBLICATIONS

American Stirling Company, Regenerators, 10 Pages. https://www.stirlingengine.com/regenerators/.

(Continued)

*Primary Examiner* — Shafiq Mian
(74) *Attorney, Agent, or Firm* — Dority & Manning, P.A.

(57) ABSTRACT

A piston apparatus includes a plurality of piston assemblies respectively having a first piston body and a first piston disposed within a first volume defined by the first piston body, a second piston body and a second piston disposed within a second volume defined by the second piston body, and a connection member coupled to the first piston and the second piston. The first and second volume respectively include an expansion chamber and a compression chamber defined by opposite sides of the corresponding piston. The respective expansion chambers fluidly communicate with a corresponding compression chamber of another one of the piston assemblies. The first volume of a first piston assembly fluidly communicates with the first volume and the second volume of a second piston assembly, and the first volume of a third piston assembly fluidly communicate with the first volume and the second volume of the second piston assembly.

10 Claims, 2 Drawing Sheets

Related U.S. Application Data continuation of application No. 16/417,764, filed on May 21, 2019, now Pat. No. 10,598,125.

(56) References Cited

U.S. PATENT DOCUMENTS

| | | | | |
|---|---|---|---|---|
| 3,552,120 | A | 1/1971 | Beale | |
| 3,777,718 | A | 12/1973 | Pattas | |
| 4,026,114 | A | 5/1977 | Belaire | |
| 4,030,297 | A | 6/1977 | Kantz et al. | |
| 4,077,216 | A | 3/1978 | Cooke-Yarborough | |
| 4,183,214 | A | 1/1980 | Beale et al. | |
| 4,199,945 | A * | 4/1980 | Finkelstein | F02G 1/0435 60/520 |
| 4,387,568 | A | 6/1983 | Dineen | |
| 4,545,738 | A | 10/1985 | Young | |
| 4,644,851 | A | 2/1987 | Young | |
| 4,717,405 | A | 1/1988 | Budliger | |
| 4,723,411 | A | 2/1988 | Darooka et al. | |
| 5,456,076 | A | 10/1995 | Zornes | |
| 5,934,076 | A | 8/1999 | Coney | |
| 6,877,314 | B2 | 4/2005 | Pels | |
| 7,134,279 | B2 | 11/2006 | White et al. | |
| 7,891,184 | B2 | 2/2011 | Gimsa | |
| 8,720,198 | B2 | 5/2014 | Wood | |
| 8,820,068 | B2 | 9/2014 | Dadd | |
| 9,689,344 | B1 | 6/2017 | Gedeon | |
| 10,598,125 | B1 * | 3/2020 | Mook | F02G 1/044 |
| 2004/0025489 | A1 | 2/2004 | Conde et al. | |
| 2010/0139262 | A1 | 6/2010 | Gimsa | |
| 2011/0030367 | A1 | 2/2011 | Dadd | |

OTHER PUBLICATIONS

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Chapter 5B—Regenerator Simple Analysis, Ohio State University, Stirling Cycle Machine Analysis by Israel Urieli, Jan. 17, 2010, 5 Pages. https://www.ohio.edu/mechanical/stirling/simple/regen_simple.html.

Conner, 3D Printed Stirling Engine, Solar Heat Engines, Simulate, Analyze, Design, Build, and Test Solar-Powered Engines, Oct. 29, 2012, 12 Pages. http://www. solarheatengines.com/2012/10/29/3d-printed-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarbeatengines.com/2012/12/18/a-regenerator-for-the-3d-printed-pe-2-stirling-engine/.

Deetlefs, Design, Simulation, Manufacture and Testing of a Free-Piston Stirling Engine, Thesis, Department of Mechatronic Engineering Stellenbosch University, Scholar Sun, South Africa, Dec. 2014, 138 Pages. https://scholar.sun.ac.za/bitstream/handle/10019.1/95922/deetlefs_design_2014.pdf?sequence=3&isAllowed=y.

Defense Visual Information Distribution Service (DVIDS), MOD II Automotive Stirling Engine, NASA, C-1986-3706, Washington, DC, 3 pages. https://www.dvidshub.net/image/844058/mod-ii-automotive-stirling-engine.

Defense Visual Information Distribution Service (DVIDS), MOD II Automotive Stirling Engine, NASA, C-1986-3724, Washington, DC, 3 pages. https://www.dvidshub.net/image/841262/mod-ii-automotive-stirling-engine.

Defense Visual Information Distribution Service (DVIDS), MOD II Automotive Stirling Engine, NASA, C-1986-3725, Washington, DC, 3 pages. https://www.dvidshub.net/image/759360/mod-ii-automotive-stirling-engine.

Devitt, Restriction and Compensation of Gas Bearings—Bently Bearings by Newway, Aston, PA, 5 Pages. https://bentlybearings.com/restriction-and-compensation/.

Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.

Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de/english/pdf/en_motorbeschreibung_040413.pdf.

Engine Piston, GIF Shared on GIPHY, 1 Page. https://giphy.com/gifs/engine-hybrid-piston-10YyqVUCHx2HC.

Free-Piston Engine Range Extender Technology, Sir Joseph Swan Centre for Energy Research, 2016. (Video) https://www.youtube.com/watch?v=u4b0_6byuFU.

Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.

Garcia-Santamaria et al., A Germanium Inverse Woodpile Structure with a Large Photonic Band Gap, Advanced Materials Communication, Wiley InterScience, 2007, Adv. Mater. 0000, 00, pp. 1-5. http://colloids.matse.illinois.edu/articles/garcia_adymat_2007.pdf.

General Electrical—GE Power, Breaking the Power Plant Efficiency Record, 2016, 4 Pages. https://www.ge.com/power/about/insights/articles/2016/04/power-plant-efficiency-record.

Georgescu, Rotary Engine, 2007. (Video Only) https://www.youtube.com/watch?v=ckuQugFH68o.

Gibson, et al., Cellular Solids Structure and Properties, Cambridge University Press, 2nd Edition, 1997. (Web Link Only) https://doi.org/10.1017/CBO9781139878326.

Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.

Hoegel et al., Theoretical Investigation of the Performance of an Alpha Stirling Engine for Low Temperature Applications, Conference: ISEC 15th International Stirling Engine Conference, ResearchGate, New Zealand, Jan. 2012, 10 Pages. https://www.researchgate.net /publication/256706755_Theoretical_investigation_of_the_performance_of_an_Alpha_Stirling_engine_for_low_temperature_applications.

Honeywell Aerospace, Ultra Long-Life, Flight Qualified Technology For High Speed Imaging and Sensing Infra-Red Detectors, Stirling Cycle Cryocoolers, Auxiliary Power and Thermal, Honeywell Aerospace, 3 Pages. https://aerospace.honeywell.com/en/products/auxiliary-power-and-thermal/stirling-cycle-cryocoolers.

Howden, Reciprocating Compressor C series—animation, Jun. 2017. (Video Only) https://www.youtube.com/watch?v=owNOdUBL37U&feature=youtu.be.

http://www.hybrid-engine-hope.com/media/pagini/95_0071d630dba777d16e9a770de27060e6.gif (Web Link Only).

Huang, Toroidal Engine Version 2.0, 2017. (Video Only) https://www.youtube.com/watch?v=n5L0Zc6Ic8Y&feature=youtu.be.

Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08PrjectPt4GtTemp.pdf.

Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.

Nightingale, Automotive Stirling Engine, Mod II Design Report, DOE/NASA/0032-28, NASA CR-175106, TI86ASE58SRI, New York, 1986, 54 Pages. https://ntrs.nasa.gov/archive/nasa/casi.ntrs.nasa.gov/19880002196.pdf.

O'Dell, SuperTruck Program Scores Big, Head into Second 5-Year Phase, Trucking.com, 2016, 7 Pages. https://www.trucks.com/2016/10/31/supertruck-program-5-year-phase/.

Owczarek, On the Design of Lubricant Free Piston Compressors, Nonlinear Solid Mechanics, Faculty of Engineering Technology, Thesis, University of Twente, Enschede, Sep. 17, 2010. (Abstract Only) https://research.utwente.nl/en/publications/on-the-design-of-lubricant-free-piston-compressors.

(56) References Cited

OTHER PUBLICATIONS

Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.
Park et al., Thermal/Fluid Characteristics of Isotropic Plain-Weave Screen Laminates as Heat Exchange Surfaces, AIAA 2002-0208, 2002, pp. 1-9 https://wolfweb.unr.edu/~rawirtz/Papers/AIAA2002-0208.pdf.
Penswick et al., Duplex Stirling Machines, Sunpower Incorporated $19^{th}$ Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.
Pneumatic Round Body Cylinder—SRG_SRG Series, Parker, Richland MI, 3 Pages. http:/ph.parker.com/us/en/pneumatic-round-body-cylinder-srg-srgm-series.
Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.
Ranieri et al., Efficiency Reduction in Stirling Engines Resulting from Sinusoidal Motions, Energies, vol. 11, No. 11: 2887, 2018, 14 Pages. https://doi.org/10.3390/en11112887.
Renewable Energy, Double-Acting Stirling Engine, Stirling Engine, 1 Page. (Abstract Only) https://sites.google.com/a/emich.edu/cae546816t5/history/types/double---acting-stirling-engine.
Rodriguez Perez, Cellular Nanocomposites: A New Type of Light Weight Advanced Materials with Improved Properties, CellMat Technologies S.L. Transfer Center and Applied Technologies, Valladolid, 35 Pages. http://crono.ubu.es/innovationh2020/pdf/cellmat.pdf.
Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.
Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 Pages (Refer to p. 7) https://www.energy.gov/sites/prod/files/2014/11/f19/BTO%202014%20Peer%20Review%20Presentation%20-%20ThermoLift%204.4.14.pdf.
Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.
Solar Cell Central, Stirling Engines, 3 Pages. http://solarcellcentral.com/stirling_page.html.
Technology, Microgen Engine Corporation, 2016, 4 Pages. https://www.microgen-engine.com/technology/technology/.
ThermoLift, Technology—Background, The Thermodynamic Process Behind ThermoLift, ThermoLift Inc., 3 Pages. http://www.tm-lift.com/background/.
Thimsen, Stirling Engine Assessment, 1007317, Electronic Power Research Institute (EPRI ), Palo Alto, California, 2002, 170 Pages. http://www.engr.colostate.edu/~marchese/mech337-10/epri.pdf.
Thomassen, Free Floating Piston Film (mpeg).mpg, Mar. 5, 2010. (Video Only) https://www.youtube.com/watch?v=bHFUi0F0PgA.
Toptica Photonics, 2-Photon Polymerization, FemtoFiber Technology for Two-Photon Polymerization, 2 Pages. https://www.toptica.com/applications/Ultrafast-studies/2-photon-polymerization/.
Toyota Motor Corporation, Inline 4 Cylinder 2.5L Injection Gasoline Engine/New Transaxle, Global Website, Dec. 6, 2016, 2 Pages. https://global.toyota/en/download/14447827/.
Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.
Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=https://www.google.com/&httpsredir=1&article=1944&context=etdarchive.
Wikipedia, Regenerative Heat Exchanger, 3 Pages. https://en.wikipedia.org/wiki/Regenerative_heat_exchanger.
Wikipedia, Stirling Engine, 2019, 24 Pages. https://en.wikipedia.org/wiki/Stirling_engine.
Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.
Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/dla3/b4ce0baa639cf349d25d1506c3fa6118dc3e.pdf.
Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/viewdoc/download?doi=10.1.1.616.3103&rep=rep1&type=pdf.
Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com/&httpsredir=1&article=1935&context=iracc.

* cited by examiner

ENGINE APPARATUS AND METHOD FOR OPERATION

CROSS-REFERENCE TO RELATED APPLICATIONS

This application is a continuation of U.S. application Ser. No. 17/528,683, filed Nov. 17, 2021, which is a continuation of U.S. application Ser. No. 16/788,402, filed Feb. 12, 2020, which is a continuation of U.S. application Ser. No. 16/417,764, filed May 21, 2019, now U.S. Pat. No. 10,598,125, the contents of each of which are incorporated herein by reference in their entirety as if set forth verbatim.

FIELD

The present subject matter relates to engine apparatuses or piston engine assemblies, such as closed-cycle engine systems, and methods for operation thereof.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. As such, there is a need for improved closed cycle engines and system arrangements that may provide improved power output, improved power density, or further improved efficiency. Additionally, there is a need for an improved closed cycle engine that may be provided to improve power generation and power distribution systems.

BRIEF DESCRIPTION

Aspects and advantages of the present subject matter will be set forth in part in the following description, or may be obvious from the description, or may be learned through practice of the present subject matter.

An aspect of the present disclosure is directed to an engine apparatus including at least four piston assemblies. Each piston assembly includes a piston attached to a connection member at a first end and a second end. Each piston of the piston assembly defines a first chamber and a second chamber separated by the piston. The first chamber and the second chamber are each defined at the first end and at the second end. Each first chamber of one piston assembly is fluidly connected to the second chamber at a different piston assembly. At least one first chamber at the first end is fluidly connected to a respective second chamber at the second end. At least one first chamber at the second end is fluidly connected to a respective second chamber at the first end. At least one first chamber at one end is fluidly connected to a respective second chamber at the same end.

In one embodiment, each first chamber at one piston assembly is fluidly connected to only one second chamber at another piston assembly.

In another embodiment, the apparatus further includes a plurality of walled conduits fluidly connecting the first chamber at one piston assembly to the second chamber of another piston assembly.

In still another embodiment, each piston assembly is mechanically separate from one another.

In yet another embodiment, the apparatus further includes a piston body surrounding the piston of the piston assembly.

In still yet another embodiment, the first chamber defines an expansion chamber and the second chamber defines a compression chamber.

In one embodiment, the connection member of the piston assembly is extended along a lateral direction, and the first end and the second end are separated along the lateral direction.

In various embodiments, a first plurality of first chambers and a first plurality of second chambers together include an interconnected volume fluidly separate from a second plurality of first chambers and a second plurality of second chambers. In one embodiment, the piston assemblies includes a first piston assembly, wherein the first piston assembly includes two first chambers and two second chambers entirely within the interconnected volume. In another embodiment, the piston assemblies include a second piston assembly. The second piston assembly includes one first chamber and one second chamber entirely within the interconnected volume. In yet another embodiment, the second piston assembly includes one first chamber and one second chamber each outside of the interconnected volume.

Another aspect of the present disclosure is directed to a closed cycle engine apparatus including a plurality of piston assemblies. Each piston assembly includes a piston attached to a laterally extended connection member in which a first end is defined laterally separated from a second end. The piston is attached to the connection member at the first end and the second end and each piston of the piston assembly defines a first chamber and a second chamber separated by the piston. The first chamber and the second chamber are each defined at the first end and at the second end. Each first chamber of one piston assembly is fluidly connected to the second chamber at a different piston assembly. A first plurality of first chambers and a first plurality of second chambers together include an interconnected volume fluidly separate from a second plurality of first chambers and a second plurality of second chambers.

In one embodiment, at least one first chamber at the first end is fluidly connected to a respective second chamber at the second end.

In another embodiment, at least one first chamber at the second end is fluidly connected to a respective second chamber at the first end.

In yet another embodiment, the plurality of piston assemblies include a first piston assembly that includes two first chambers and two second chambers entirely within the interconnected volume. In one embodiment, the plurality of piston assemblies further includes a second piston assembly that includes one first chamber and one second chamber entirely within the interconnected volume and one first chamber and one second chamber each outside of the interconnected volume.

Yet another aspect of the present disclosure is directed to a method for operating a balanced pressure piston apparatus containing an engine working fluid. The apparatus includes a plurality of piston assemblies each defining its respective lateral direction from a first end to a second end. The piston assembly defines a plurality of a first chamber and a plurality of a second chamber fluidly connected to one another across different piston assemblies. The method includes flowing a first portion of the engine working fluid through a first plurality of interconnected chambers including a first chamber on the first end of a first piston assembly and a second chamber on the second end of a second piston assembly, and flowing a second portion of the engine working fluid through a second plurality of chambers, wherein the first portion of the engine working fluid is fluidly separate from the second portion of the engine working fluid.

In various embodiments, the method further includes articulating the piston assembly in a first direction while the working fluid is at a substantially uniform temperature at the first chamber and the second chamber, in which the second piston assembly is stationary when the first piston assembly is articulated in the first direction. In one embodiment, the method further includes generating a first pressure at the first chamber of the first piston assembly by articulating the first piston assembly along the first direction, transmitting, via the first plurality of interconnected chambers, the first pressure to the second chamber of the second piston assembly, and generating a second pressure at the second piston assembly at the second plurality of chambers, in which the second pressure and the first pressure together generate a substantially zero net force at the second piston assembly.

In another embodiment, the method includes articulating the piston assemblies in balanced phase arrangement relative to one another while the working fluid is at a temperature differential at the working fluid relative to the first chamber and the second chamber.

In yet another embodiment of the method, articulating the piston assembly includes actuating only one piston assembly.

These and other features, aspects, and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure including the best mode, directed to one of ordinary skill in the art, is set forth in the specification, which makes reference to the appended figures, in which.

Figure 1:
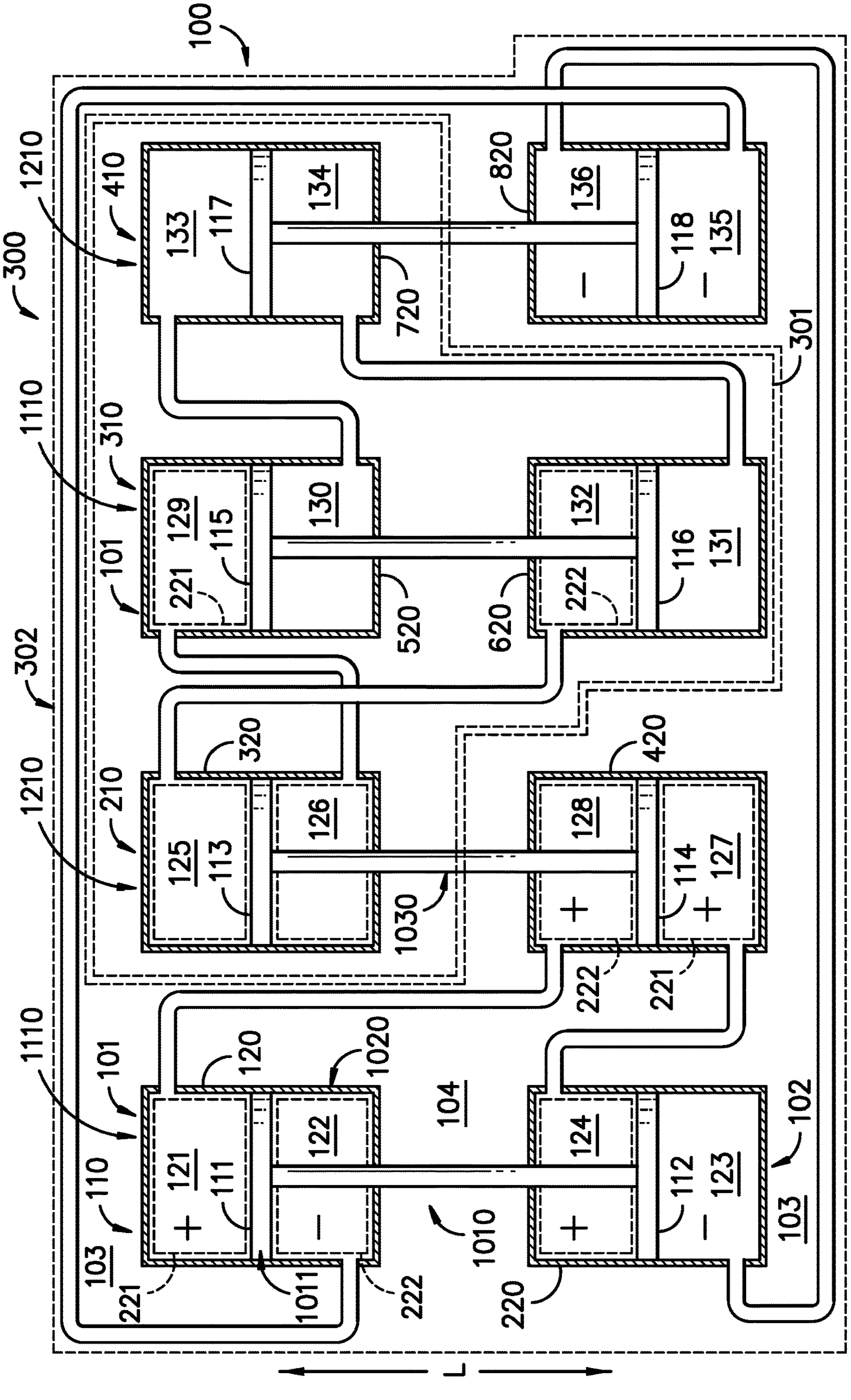
FIG. 1 is an exemplary schematic layout view of an embodiment of a piston engine apparatus according to aspects of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

As used herein, the terms “first”, “second”, and “third” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows. The term “loop” can be any suitable fluid pathway along which fluid can flow and can be either open or closed, unless stated otherwise.

Embodiments of a multi-piston engine apparatus 100 provided herein show and describe a balanced pressure piston engine containing an engine working fluid. Certain embodiments of the engine shown and described herein provide dynamic stability in amplitude, frequency, or both. Various embodiments of the apparatus further provide for power to be modulated by piston stroke via a free piston assembly arrangement as a passively balanced system during operation. As such, the engine provided herein may operate in balanced pressure or balanced phase arrangement without control systems or mechanical linkages between piston assemblies, such as camshafts, crankshafts, etc. Other embodiments provide for balanced pressure arrangement with force transmission linkages coupling piston assemblies with minimal power losses. Certain embodiments of the engine provided herein mitigate or disrupt propagation of pressure waves that may disrupt an intended motion (dynamic stability in amplitude, frequency, phase, center point of oscillation or all of these) of a plurality of pistons in a closed cycle engine arrangement such as a Stirling engine generally. The embodiments of the engine provided herein include a closed cycle piston engine arrangement including a plurality of chambers in particular fluid connection such as to provide pneumatic isolation or force cancellation at adjacent chambers when the engine working fluid is at a uniform temperature at the plurality of chambers.

Closed cycle engine arrangements generally include a plurality of pistons defining an expansion chamber and a compression chamber, or a hot chamber and a relatively cold chamber, defined by a piston within a cylinder. Such closed cycle engine arrangements may include, but are not limited to, a Stirling engine assembly, or variations thereof, such as, alpha, beta, or gamma Stirling configurations, or other variations, such as, but not limited to, a Vuilleumier, Franchot, or Rinian engine arrangement. Certain configurations, such as beta and gamma configurations, further include a displacer piston in contact with the hot chamber and the cold chamber and a power piston in contact with the cold chamber. Further configurations, such as a Vuilleumier arrangement, include a warm chamber in which one piston is in contact with the hot chamber and the warm chamber and another piston is in contact with the cold chamber and the warm chamber. However, configurations including the warm chamber are generally counter-productive to providing improved power density, as the warm chamber is used to improve operation of the engine but decreases power generation per unit volume of working fluid.

In other configurations including a hot chamber and a cold chamber, or in various configurations, additionally a warm chamber, undesired creation and propagation of pressure waves may occur across fluidly connected chambers. Such pressure propagation may inhibit operation of the engine at transient conditions, such as via undesired harmonics or vibrations that cause undesired operation or unacceptable power losses. Pressure propagation may further, or alternatively, cause undesired phase-shift, undesired changes in amplitude, or run-away behavior of the pistons relative to one another, such as to result in undesired operation of the engine.

For example, in certain free piston Stirling engine arrangements, serial or consecutive coupling of a compression chamber at one reciprocating piston to an adjacent or serially consecutive expansion chamber of another reciprocating piston, and further connected in a loop to the first reciprocating piston, provide a change in pressure in one chamber to induce movement of the piston in contact with the chamber. Such change in pressure in one chamber inducing movement of the piston in contact with the chamber may further occur even in the absence of a thermal load, such as a thermally-driven expansion and contraction of a volume of fluid. As such, a change in pressure results in the other chamber defined by the same piston (i.e., the chamber defined on an opposite side of the same piston). The change in pressure produces a pressure wave and corresponding force that is allowed to propagate to each adjacent or serially consecutive fluidly coupled chamber and the associated piston at the fluidly coupled chamber. The pressure wave propagation is allowed to repeat, or may repeat indefinitely, through the plurality of fluidly coupled chambers and associated pistons of the engine. The pressure wave and corresponding force may subsequently propagate through the serially coupled chambers back to the first reciprocating piston. The pressure wave propagation may therefore create harmonic waves and disrupt an intended motion (e.g., frequency, amplitude, and/or phase, or combinations thereof), or an intended center-point of motion in a multi-piston arrangement, or both.

Additionally, or alternatively, the pressure wave propagation means that movement of one reciprocating piston induces movement of each adjacent piston of the fluidly connected chambers. As such, pressure wave propagation may cause movement of adjacent pistons within the fluidly connected arrangement of chambers. The pressure wave propagation across fluidly connected chambers results in the pistons being articulated, at least in part, by mechanical forces (i.e., pressure waves and their corresponding forces) rather than via thermal differences between the hot chamber and the cold chamber.

Pressure wave propagations may further adversely affect double acting piston assemblies, or particularly double acting free piston assemblies. For example, the fluidly connected arrangement of chambers may be arranged such that pistons at one end of a piston assembly include one fluidly coupled arrangement of chambers and pistons at another end of the piston assembly include another fluidly coupled arrangement of chambers. However, the fluidly coupled arrangements may allow pressure wave propagations to cause movement of one piston assembly due to movement of another piston assembly even with uniform temperatures at the chambers. Stated differently, fluidly connected arrangements of piston assemblies allow mechanical forces (i.e., pressure propagation) to induce movement of adjacent piston assemblies rather than thermal differences between the chambers.

In certain instances, such pressure wave propagation may cause the affected piston to displace to an extreme position, such as top dead center (TDC) or bottom dead center (BDC). Displacement to the extreme position may cause the piston to contact or crash into the extreme end of the surrounding cylinder, such as to damage the piston or cylinder or otherwise adversely affect power output, stability, or operation of the engine. As another example, pressure wave propagation inducing movement of adjacent pistons via mechanical forces may result in unbalanced phase movement of the pistons relative to one another, which may result in undesired operation. Pressure wave propagation may generally result in undesired operation of the engine such as to cause undesired power losses, damage, vibrations, or other losses to power output or operability.

In still other examples, Stirling engines, or variations thereof, may include fluid coupling of expansion and compression chambers such as to result in a force acting on a piston along its direction of motion. Such examples promote self-starting, such as to reduce input power necessary for starting the engine. However, such self-starting behavior may result from or provide pressure wave propagation during operation of the engine, such as to result in undesired operation of the engine as described above.

Referring to FIG. 1, embodiments of a balanced pressure engine are provided (hereinafter, "apparatus 100"). Embodiments of the apparatus 100 provided herein may provide pressure-balanced operation of a multi-piston closed cycle engine in which pressure wave propagation across the pistons is mitigated, eliminated, or otherwise disrupted from propagating beyond one or more piston assemblies. The embodiments of the apparatus 100 provided herein may further provide a phase-balanced arrangement in which the plurality of pistons may operate at an equal phase relationship relative to one another. The embodiments of the apparatus 100 provided herein may further reduce undesired instabilities, vibrations, harmonics, or other dynamics that may result in power losses, damage, or other losses to power output or operability. Still further, embodiments of the apparatus 100 provided herein provide improved performance, such as via stable operation of the multi-piston arrangement without a warm chamber or other intermediate chamber.

Additionally, or alternatively, embodiments of the apparatus 100 provided herein may beneficially provide balanced pressure arrangement of a plurality of piston assemblies 1010 during operation of the apparatus. The balanced pressure arrangement operation of the apparatus 100 may be identified by the stationary behavior of one piston assembly following articulation or actuation of another piston assembly when the engine working fluid is at a substantially uniform temperature in the apparatus 100. The apparatus 100 may provide the stationary behavior of the piston assembly via substantially equal and opposite forces produced at an adjacent piston assembly following articulation of another piston assembly.

Embodiments of the apparatus 100 may beneficially improve overall stability, balance, power output, and operability of the apparatus via the balanced pressure arrangements provided herein. Additionally, various embodiments of the apparatus 100 may beneficially improve overall operation of piston engine assemblies, such as closed cycle engine assemblies, despite detriments that may be associated with production of substantially equal and opposite forces at an adjacent piston assembly. For example, embodiments of the apparatus 100 provided herein may include beneficial improvements to overall operation greater than losses associated with starting the apparatus 100. As another example, the substantially equal and opposite forces at an adjacent piston assembly may increase a threshold input power required to initialize operation of the piston assemblies (i.e., articulation of the piston assemblies), such as to require a greater input torque or power at the piston assembly to overcome greater counteracting forces, inertia, etc. However, in contrast, operation of the piston assemblies thereafter may include improved stability, power output, reduced vibrations, mitigated risk of damage or other losses to power or operability.

Referring to FIG. 1, the apparatus 100 includes a plurality of piston assemblies 1010 each fluidly coupled to one another in balanced pressure and/or balanced phase arrangement. The piston assembly 1010 includes a piston 1011. In various embodiments, the piston assembly 1010 includes a pair of pistons 1011 attached to one another via a connection member 1030. In still various embodiments, the piston assemblies 1010 can operate in balanced pressure and/or balanced phase relationship while being mechanically independent of one another. For example, the apparatus 100 may exclude camshafts, crankshafts, rocker arms, or other mechanical linkages coupling two or more of the piston assemblies. In other embodiments, the piston assembly 1010 may include a linkage coupling two or more piston assemblies in balanced pressure and/or balanced phase arrangement.

The piston 1011 of the piston assembly 1010 is surrounded by a piston body 1020. The piston body 1020 defines at least one of a first chamber 221 or a second chamber 222. In various embodiments, the piston body 1020 defines at one side of the piston 1011 a first chamber 221, such as an expansion chamber, a hot chamber, or first localized fluid volume within the piston body 1020. The first chamber 221 may be positioned in thermal communication with a heat source, such as to provide heat or thermal energy into the first chamber 221. The piston body 1020 further defines at another side of the piston 1011 a second chamber 222, such as a compression chamber, a cold chamber, or second localized fluid volume within the piston body 1020. The second chamber 222 may be positioned in thermal communication with a heat sink, such as to remove thermal energy or heat from the second chamber 222. A plurality of walled conduits 1050 fluidly connects the first chamber 221 of one piston assembly and the second chamber 222. A portion of the first chambers 221 and the second chambers 222 are contained within an interconnected volume 300.

A first plurality of chambers, such as depicted within interconnected volume 300, includes a first plurality of the first chambers 221 and a first plurality of the second chambers 222 within the interconnected volume 300 fluidly separate and/or pneumatically separate from a second plurality of chambers including the first chamber 221 and the second chamber 222 outside of the interconnected volume 300. In one embodiment, the first plurality of chambers is depicted within a first interconnected volume 301. The first interconnected volume 301 of chambers 221, 222 includes the first plurality of first chambers 221 and the first plurality of second chambers 222 fluidly separate and/or pneumatically separate from the second plurality of first chambers and second chambers outside of the first interconnected volume 301, such as depicted within the second interconnected volume 302.

Stated differently, pressure waves or motive forces formed within the plurality of chambers forming the interconnected volume 300 by the movement of one piston assembly 1010 are mitigated from propagating to another piston assembly 1010. Stated still differently, pressure waves or motive forces formed outside of the plurality of chambers forming the interconnected volume 300 by the movement of one piston assembly 1010 are mitigated from propagating to another piston assembly 1010. In one embodiment, the interconnected volume 300 of the plurality of chambers may separate pressure wave propagation and motive forces developed outside of the interconnected volume 300 from acting upon the one or more pistons 1011 within the interconnected volume 300 of chambers. Additionally, or alternatively, the interconnected volume 300 may separate pressure wave propagation and motive forces developed within the interconnected volume 300 of first chambers 221 and second chambers 222 from acting upon the one or more pistons 1011 outside of the interconnected volume 300.

In various embodiments, the portion of the plurality of walled conduits 1050 fluidly connects the first chamber 221 of one piston assembly and the second chamber 222 of another piston assembly into an interconnected volume 300. The interconnected volume 300 defines a fluid interconnection of the first chamber 221 and the second chamber 222 at different piston assemblies 1010 such that a fluid communication or fluid leakage path between the first chamber 221 and the second chamber 222 of the same piston 1011 provides a single fluid loop separated from the fluidly connected chambers 221, 222 outside of the interconnected volume 300. In one embodiment, the balanced pressure arrangement and/or the balance phase arrangement of the piston assemblies 1010 is the fluid interconnection of the walled conduits 1050 and chambers 221, 222 such that the chambers 221, 222 within the interconnected volume 300 are substantially fluidly separate and/or pneumatically separate from those chambers 221, 222 outside of the interconnected volume 300 to provide a substantially equal and opposite force relative to one another to at least one piston assembly 1010 when the engine working fluid within the chambers 221, 222 is at a uniform temperature. In various embodiments, the apparatus 100 includes a plurality of interconnected volumes 300, such as a first interconnected volume 301 fluidly separate and pneumatically separate from a second interconnected volume 302.

In one embodiment, the plurality of piston assemblies 1010 includes a first piston assembly 1110 fluidly coupled to a second piston assembly 1210 via the walled conduit 1050. The first chamber 221 and the second chamber 222 may each define a spring, such as a gas spring (i.e., a spring-mass system in which the gas spring is at least in part the engine working fluid, such as helium, hydrogen, or air, or another suitable working fluid). The first chamber 221 at the first piston assembly 1110 is fluidly coupled to the second chamber 222 at the second piston assembly 1210 in balanced pressure arrangement, i.e., at substantially uniform temperatures relative to the first chamber 221 and the second chamber 222, movement of the first piston assembly 1110 provides substantially equal and opposite force at the piston 1011 or connection member 1030 of another piston assembly (e.g., the second piston assembly 1210) such as to result in a substantially zero net force, such as depicted via signs + or − in FIG. 1. The substantially zero net force at the other piston assembly, such as the second piston assembly 1210, results in non-movement or stationary behavior of the second piston assembly 1210 despite movement of the first piston assembly 1110.

In various embodiments, the first chamber 221 and the second chamber 222 each define the spring as a gas spring based at least on the fluid coupling of the first chamber 221 of the first piston assembly 1110 to the second chamber 222 of the second piston assembly 1210 to include at least two interconnected volumes 301, 302 fluidly and/or pneumatically separate from one another (i.e., balanced pressure arrangement). In one embodiment, the at least two interconnected volumes includes the first interconnected volume 301 substantially fluidly isolated and pneumatically isolated from the second interconnected volume 302.

The arrangement of the interconnected volume 300, or plurality thereof, mitigates pressure propagation across the plurality of piston assemblies 1010 such that movement of adjacent piston assemblies is not driven by mechanical forces. Stated differently, the arrangement of the chambers 221, 222 within the interconnected volume 300 relative to chambers outside of the interconnected volume 300 provides for movement of one piston assembly of the interconnected volume 300 to induce an equal and opposite force at an adjacent piston assembly in fluid contact with the piston assembly 1010 outside of the interconnected volume 300. Alternatively, the arrangement of chambers 221, 222 within the first interconnected volume 301 relative to chambers within the second interconnected volume 302 provides for movement of one piston assembly at one interconnected volume to induce an equal and opposite force at an adjacent piston assembly at another interconnected volume.

In various embodiments, the adjacent or second piston assembly 1210 is in fluid contact with the interconnected volume 300 and outside thereof. In another embodiment, the second piston assembly 1210 is in fluid contact with the first interconnected volume 301 and the second interconnected volume, and the first piston assembly 1110 is in fluid contact with only the interconnected volume 300, such as either the first interconnected volume or the second interconnected volume 302. As such, when the first chamber 221 and the second chamber 222 are each at uniform temperature conditions, mechanical movement of one piston assembly will not induce movement of another piston assembly. Still further, when the first chamber 221 and the second chamber 222 are at a temperature differential or delta temperature relative to one another, such as to define a hot chamber and a cold chamber respectively, movement of the piston assemblies is substantially only via the temperature differential rather than mechanical forces such as pressure wave propagation.

Figure 2:
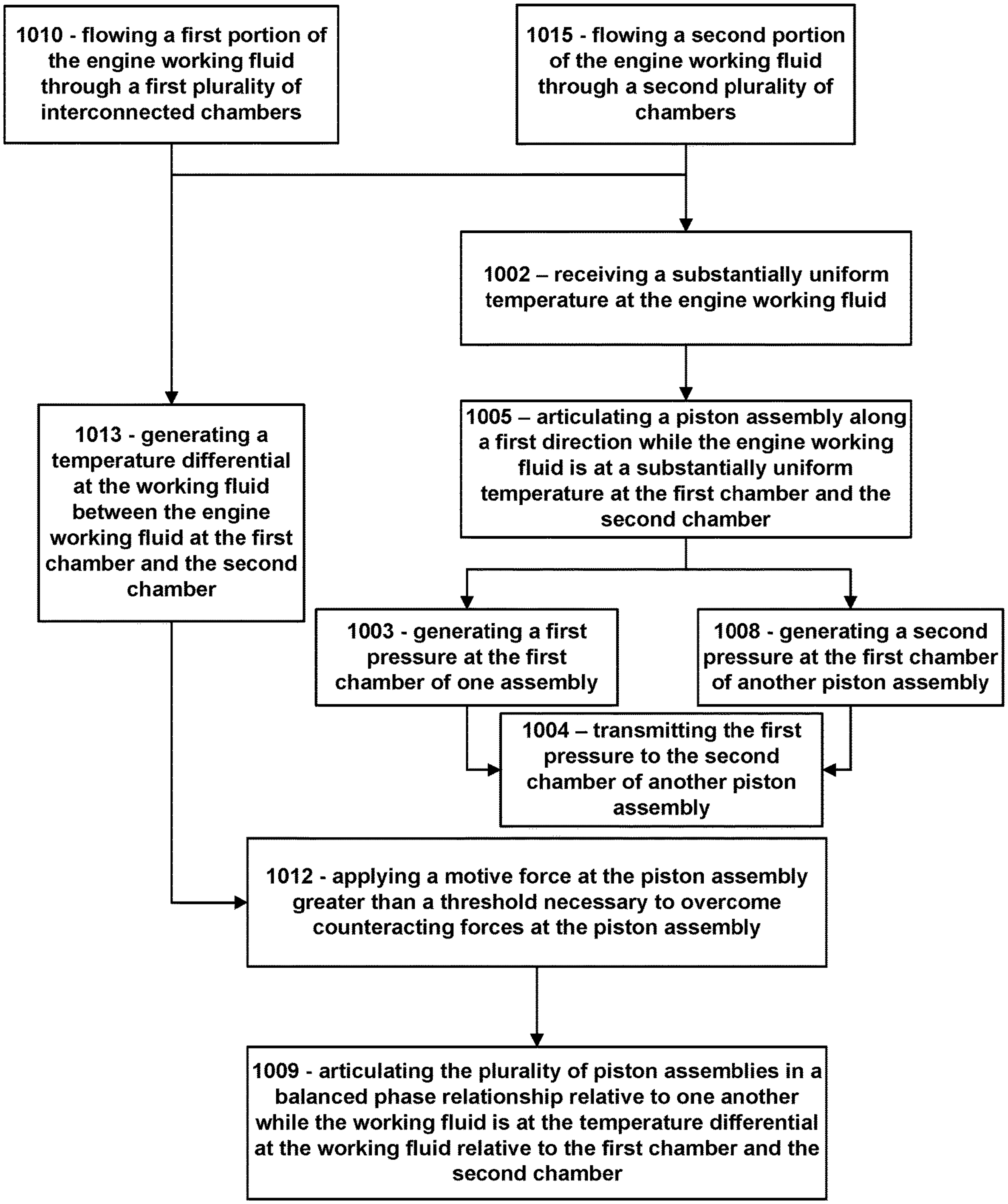
FIG. 2 is a flowchart outlining exemplary steps of a method for operating an engine apparatus.

In various embodiments, such as outlined in the flowchart provided in FIG. 2, a method for operating a piston apparatus is provided (hereinafter, "method 1000"). The method 1000 may include balanced pressure operation of the piston apparatus. The method 1000 may be implemented in engine apparatuses, such as closed cycle engine systems or the apparatus 100 provided in regard to FIG. 1. The method 1000 includes at 1010 flowing a first portion of the engine working fluid through a first plurality of interconnected chambers including a first chamber on the first end of a first piston assembly and a second chamber on the second end of a second piston assembly. Flowing the first portion of engine working fluid may include flowing the first portion of engine working fluid within a fluidly interconnected volume (e.g., interconnected volume 301 in FIG. 1) of a first plurality of first chambers and a first plurality of second chambers in a single fluid loop. The method 1000 may include at 1010 generating an interconnected volume by fluidly interconnecting a portion of the plurality of first chambers of one piston assembly and the plurality of second chambers of another piston assembly into a single fluid loop when the first chamber and the second chamber of the same piston is in fluid communication. The first chamber and the second chamber within the interconnected volume are each fluidly separate from the first chamber and the second chamber outside of the interconnected volume. At least one first chamber of one end of one piston assembly is fluidly coupled to the second chamber of another end of another piston assembly.

In particular embodiments, the method 1000 further includes at 1015 flowing a second portion of the engine working fluid through a second plurality of chambers, in which the first portion of the engine working fluid is fluidly separate from the second portion of the engine working fluid. In various embodiments, the second portion of the engine working fluid may be defined in a second interconnected volume of chambers (e.g., interconnected volume 302 in FIG. 1) separated from the first interconnected volume of chambers.

In various embodiments, the method 1000 further includes at 1002 receiving, at the engine working fluid at the first chamber 221 and the second chamber 222, a substantially uniform temperature. The method 1000 may further include at 1003 generating a first pressure at the first chamber (e.g., first chamber 221) of one piston assembly (e.g., the first piston assembly 1110) by articulating the piston assembly along the first direction. The method 1000 may further include at 1004 transmitting the first pressure to the second chamber (e.g., second chamber 222) of another piston assembly at which the first chamber is fluidly interconnected (e.g., the second piston assembly 1210), such as via the first plurality of interconnected chambers (e.g., the chambers of the first interconnected volume 301). The method 1000 may further include at 1008 generating a second pressure at the second piston assembly (e.g., second piston assembly 1210) at the second plurality of chambers (e.g., the chambers not of the first interconnected volume 301, or the chambers of the second interconnected volume 302), in which the second pressure and the first pressure together generate a substantially zero net force at the second piston assembly. The second pressure and the first pressure together generate a substantially zero net force at the other piston assembly (e.g., the second piston assembly 1210) such that the other piston assembly (e.g., the second piston assembly 1210) is stationary when the first piston assembly is articulated in the first direction.

Stated differently, forces induced at the second piston assembly via the second pressure are equal and opposite of the forces induced by the first piston assembly via the first pressure. As such, the second piston assembly remains stationary when the first piston assembly is articulated in the first direction when the engine working fluid at the first chamber and the second chamber is at a uniform temperature relative to one another. Generally, the second piston assembly remains stationary when the first piston assembly is articulated in the first direction when the engine working fluid within the apparatus 100 is at a uniform temperature.

In still various embodiments, the method 1000 includes at 1013 generating a temperature differential at the working fluid between the engine working fluid at the first chamber 221 and the second chamber 222. In another embodiment, the method 1000 includes at 1009 moving or otherwise articulating the plurality of piston assemblies 1010 in a balanced phase relationship relative to one another while the working fluid is at the temperature differential at the working fluid relative to the first chamber 221 and the second chamber 222. Articulating the piston assemblies 1010 may include starting one or more of the first piston assembly 1110 via a starter motor, mechanical power input, or other starter device. Articulating the piston assemblies in balanced phase relationship may further include articulating the plurality of piston assemblies in balanced phase relationship when the temperature differential is applied at the engine working fluid at the first chamber versus the second chamber.

In yet another embodiment, the method 1000 further includes at 1012 applying a motive force at the piston assembly greater than a threshold necessary to overcome counteracting forces at the piston assembly. In various embodiments, the threshold corresponds to friction, inertia, or other forces preventing movement of the piston assembly via the temperature differential. For example, the other forces preventing movement may include, at least in part, equal and opposite forces resulting from the balanced pressure arrangement of the piston assemblies. As such, the arrangement of piston assemblies 1010 may provide the balanced pressure and/or balanced phase relationship of the apparatus 100 and may further require a greater motive force to articulate the piston assembly 1010 during start-up from rest or non-operation.

It should be appreciated that the phase angle of the balanced phase arrangement may depend at least in part on the quantity of the plurality of piston assemblies 1010 of the apparatus 100. In various embodiments, the phase angle between four piston assemblies, or factors thereof, 1010 is approximately 90 degrees, 180 degrees, or 270 degrees. In another embodiment, the phase angle between three piston assemblies 1010, or factors thereof, is approximately 30 degrees, 60 degrees or 120 degrees. In yet another embodiment, the phase angle between five piston assemblies 1010, or factors thereof, is approximately 72 degrees.

In still various embodiments, the apparatus 100 includes a plurality of piston assemblies 1010 in which each piston assembly 1010 defines a first end 101 separated from a second end 102 (e.g., separated along a lateral direction L co-directional to extension or displacement of a piston 1011 of the piston assembly 1010). A pair of pistons 1011 is each connected at the first end 101 and the second end 102. In various embodiments, the pair of pistons 1011 is each connected via the connection member 1030 extended to separate each piston 1011 such as to dispose one piston 1011 at the first end 101 and another piston 1011 at the second end 102. The piston body 1020 surrounds the piston 1011 and defines the first chamber 221 and the second chamber 222 each separated by the piston 1011 at each piston assembly 1010. The plurality of walled conduits 1050 fluidly connects the first chamber 221 at one piston assembly 1010 to the second chamber 222 at another piston assembly 1010. The plurality of walled conduits 1050 fluidly connects the chambers to define at least two interconnected volumes 300 of chambers 221, 222 and walled conduits 1050. Each interconnected volume 300, such as depicted at first interconnected volume 301 and second interconnected volume 302, is fluidly separate from one another. Each interconnected volume 301, 302 is further fluidly separate and/or pneumatically separate from one another. The plurality of piston assemblies 1010 are in balanced pressure arrangement via the plurality of interconnected volumes 300.

The fluidly separated and/or pneumatically separated or isolated interconnected volume 300 includes a pair of the first chamber 221 at the one end fluidly connected to a respective second chamber 222 at the other end. In one embodiment, each interconnected volume 300 includes the first chamber 221 at the first end 101 fluidly connected to a respective second chamber 222 at the second end 102. In another embodiment, the interconnected volume 300 includes the first chamber 221 at the second end 102 fluidly connected to a respective second chamber 222 at the first end 101. As such, the interconnected volume 300 further provides a substantially net zero force at the piston assembly 1010 such as described above.

The fluidly separated and/or pneumatically separated interconnected volume 300 further includes at least two pair of the first chamber 221 at the first end 101 or the second end 102 is each fluidly connected to a respective second chamber 222 at the same end. In one embodiment, at least two pair of the first chamber 221 at the first end 101 is each fluidly connected to a respective second chamber 222 at the first end 101. In another embodiment, at least two pair of the first chamber 221 at the second end 102 is each fluidly connected to a respective second chamber 222 at the second end 102. In still another embodiment, at least four pair of the first chamber 221 at one end is each fluidly connected to a respective second chamber 222 at the same end.

The interconnected volume 300 further includes the first piston assembly 1110 entirely within the interconnected volume. The interconnected volume 300 further includes the second piston assembly 1210 in which one end or pair of hot chamber and cold chamber (e.g., at the first end 101) is within one interconnected volume (e.g., the first interconnected volume 301) and the other end or pair of hot chamber and cold chamber (e.g., at the second end 102) is outside of the interconnected volume or within another interconnected volume (e.g., the second interconnected volume 302). As such, the balanced pressure arrangement mitigates pressure wave propagation at the second piston assembly, such as depicted at arrows 150, when an equal and opposite force is applied to the second piston assembly.

In one embodiment, the interconnected volume 300 fluidly and/or pneumatically separate from other chambers and walled conduits in balanced pressure arrangement each include a hot chamber (i.e., a first chamber) of one piston assembly fluidly connected to a respective cold chamber (i.e., a second chamber) of another piston assembly (i.e., each hot chamber is fluidly connected to the respective cold chamber at the piston assembly different from the hot chamber). The interconnected volume includes a first hot chamber (i.e., a first-first chamber) at the first end fluidly connected to a respective cold chamber (i.e., a second chamber) at the second end. The engine further includes a second hot chamber (i.e., a second-first chamber) at the second end fluidly connected to a respective cold chamber at the first end. Two or more other hot chambers (i.e., first chambers other than the first-first chamber and the second-first chamber) at one end are each fluidly connected to respective cold chambers at the same end.

In one embodiment, a third hot chamber (i.e., a third-first chamber) at the one end, such as the first end, is fluidly connected to a respective cold chamber at the same end, such as the first end. In another embodiment, the third hot chamber at one end, such as the second end, is fluidly connected to a respective cold chamber at the same end, such as the second end. In still another embodiment, a fourth hot chamber (i.e., a fourth-first chamber) at the same end as the third hot chamber, such as either the first end or the second end, is fluidly connected to a respective cold chamber at the same end. In another embodiment, the fourth hot chamber at the other end relative to the third chamber is fluidly connected to a respective cold chamber at the same end (i.e., the other end relative to the third chamber).

Referring still to FIG. 1, the plurality of piston assemblies includes four piston assemblies 110, 210, 310, 410. In various embodiments, the four piston assemblies 110, 210, 310, 410 are each mechanically separate from one another. Each piston 111, 112, 113, 114, 115, 116, 117, 118 of each respective piston assembly (such as described in regard to piston 1011 of FIG. 1) is surrounded by the piston body 120, 220, 320, 420, 520, 620, 720, 820 (such as described in regard to piston body 1020). The plurality of piston assemblies 110, 210, 310, 410 together define eight hot or expansion chambers 121, 123, 125, 127, 129, 131, 133, 135 (i.e., eight-first chambers 221 of FIG. 1). The apparatus 100 further includes eight cold or compression chambers 122, 124, 126, 128, 130, 132, 134, 136 (i.e., eight-second chambers 222 of FIG. 1). The expansion or hot chamber of one piston assembly is fluidly connected to the compression or cold chamber of another piston assembly different from the expansion or hot chamber. Additionally, the engine includes two interconnected volumes 301, 302 each fluidly separate and/or pneumatically separate or isolated from one another such as described above.

Referring still to FIG. 1, the first interconnected volume 301 includes a pair of the hot chambers at one end each fluidly connected to a respective cold chamber at the other end. For example, hot chamber 125 at the first end 101 is fluidly coupled to the cold chamber 132 at the second end 102. Additionally, the hot chamber 131 at the second end 102 is fluidly coupled to the cold chamber 134 at the first end 101. The first interconnected volume 301 further includes a piston assembly (i.e., first piston assembly 1110 of FIG. 1) entirely within the first interconnected volume 301, such as depicted at piston assembly 310.

The second interconnected volume 302 includes a pair of the hot chambers at one end each fluidly connected to a respective cold chamber at the other end. For example, hot chamber 121 at the first end 101 is fluidly coupled to the cold chamber 128 at the second end 102. Additionally, the hot chamber 135 at the second end 102 is fluidly coupled to the cold chamber 122 at the first end 101. The second interconnected volume 302 further includes a piston assembly entirely (i.e., first piston assembly 1110 of FIG. 1) within the second interconnected volume 302, such as depicted at piston assembly 110.

The apparatus 100 further includes a piston assembly in which the piston body at one end is pneumatically coupled to one interconnected volume and the piston body at the other end is pneumatically coupled to another interconnected volume (i.e., second piston assembly 1210 of FIG. 1). For example, referring to FIG. 1, the piston assembly 210 includes the piston body 320 within the first interconnected volume 301 and the piston body 420 within the second interconnected volume 302. The piston assembly 410 further includes the piston body 720 within the first interconnected volume 301 and the piston body 820 within the second interconnected volume 302.

Referring still to FIG. 1, when the first piston assembly 1110 at the first interconnected volume 301 or the second interconnected volume 302 is moved or otherwise articulated along the lateral direction L toward the first end 101 separated from the second end 102 along the lateral direction L, flows within the conduits and chambers are such as depicted via signs "+" and "–". More particularly, the first piston assembly 1110 includes both pairs of hot chamber and cold chamber (i.e., both hot chambers and cold chambers at both of ends 101, 102) within either the first interconnected volume 301 or the second interconnected volume 302, such as depicted at piston assembly 110, 310.

At the second piston assembly 1210 at which one pair of hot chamber and cold chamber is included in the first interconnected volume 301 and another pair of hot chamber and cold chamber is included at the second interconnected volume 302 (such as depicted at piston assembly 210, 410 of FIG. 1), the forces exerted by the flows of engine working fluid are equal and opposite when the chambers are at uniform temperature conditions, such as depicted at piston body 420 of the second piston assembly 210. As such, movement or articulation of one piston assembly of one interconnected volume, such as the first piston assembly 1110, does not induce movement of another piston assembly of one or more interconnected volumes, such as the second piston assembly 1210. Stated differently, without thermal differences at the chambers, the piston assemblies are in balanced pressure arrangement such as to provide equal and opposite forces at adjacent piston assemblies when a first piston assembly is articulated.

Other exemplary embodiments of apparatus 100 may be configured substantially similarly as shown and described in regard to FIG. 1 for four or more piston assemblies 1010. The plurality of piston assemblies 1010 includes the first piston assembly 1110 of the interconnected volume 300. The plurality of piston assemblies 1010 further include the second piston assembly 1210 at which the expansion or first chamber 221 and the compression or second chamber 222 is positioned within the interconnected volume. The plurality of piston assemblies 1010 further include the second piston assembly 1210 at which the expansion or first chamber 221 and the compression or second chamber 222 is positioned outside of the interconnected volume 300.

In still various embodiments, the second piston assembly 1210 includes a first piston body at which the first chamber 221 and the second chamber 222 is inside the interconnected volume 300, such as depicted at piston bodies 320, 520, 620, 720 relative to the first interconnected volume 301, or such as depicted at piston bodies 120, 220, 420, 820 relative to the second interconnected volume 302. The second piston assembly 1210 further includes a second piston body at which the first chamber 221 and the second chamber 222 is outside of the interconnected volume 300. Stated differently, the first piston assembly 1110 includes the first piston body at both ends 101, 102 each within the interconnected volume 300, such as depicted at piston bodies 520, 620 relative to the first interconnected volume 301 and piston bodies 120, 220 relative to the second interconnected volume 302. The second piston assembly 1210 includes the first piston body within one interconnected volume 300 (e.g., at the first interconnected volume 301) and the second piston body within another interconnected volume 300 (e.g., at the second interconnected volume 302). For example, second piston assembly 1210 at 210 includes the first piston body 320 within the first interconnected volume 301 and the second piston body 420 outside of the first interconnected volume 301 (e.g., within the second interconnected volume 302). As another example, the second piston assembly 1210 at 410 includes the first piston body 720 within the first interconnected volume 301 and the second piston body 820 outside of the first interconnected volume 301 (e.g., within the second interconnected volume 302).

It should be appreciated that exemplary embodiments may be referred to alternatively as the second piston assembly 1210 at 210 including the first piston body 420 within the second interconnected volume 302 and the second piston body 320 outside of the second interconnected volume 302

(e.g., within the first interconnected volume 301). As another example, the second piston assembly 1210 at 410 includes the first piston body 820 within the second interconnected volume 302 and the second piston body 820 outside of the second interconnected volume 302 (e.g., within the second interconnected volume 301).

Various other embodiments may include more than four piston assemblies with one or more interconnected volumes such as described herein.

In various embodiments, the apparatus 100 may be configured to operate a portion of the plurality of piston assemblies 1010 while another portion, such as the remainder of the piston assemblies, remain substantially stationary. In one embodiment, the apparatus 100 may be configured to receive and/or transfer thermal energy at a portion of the piston assemblies 1010 sufficient to articulate the piston assemblies 1010 while another portion of the piston assemblies receives and/or transfers an insufficient amount of thermal energy to sustain operation of another portion of the piston assemblies. For example, the other portion of piston assemblies may define zero or substantially thermal difference between the first chamber 221 and the second chamber 222. As another example, a thermal difference between the first chamber 221 and the second chamber 222 may be below a threshold temperature difference such as to be too low to sustain movement of the piston assembly. Operation of a portion of the plurality of piston assemblies 1010 may be provided by disruption of the pressure wave propagation via the interconnected volume 300. As such, a portion of the plurality of piston assemblies 1010 may be disabled from operation based on a desired output power to a load device, a capacitor 184, or both, or another control output.

Referring to FIG. 1, various embodiments of the apparatus 100 define a distal or outer end 103 and a proximal or inner end 104 each relative to the arrangement of piston bodies 1020. For example, the outer end 103 is the area at which the piston bodies 1020 are farthest from one another. As another example, the inner end 104 is the area at which the piston bodies 1020 are nearest to one another. In other embodiments, the outer end 103 is distal to a geometric center of the connection member 1030 and the inner end 104 is proximal to the geometric center of the connection member 1030.

Although the expansion chamber or first chamber 221 is generally depicted at the outer end 103 and the compression chamber or second chamber 222 is generally depicted at the inner end 104, it should be appreciated that in other embodiments the first chamber 221 may be positioned at the inner end 104 and the second chamber 222 may be positioned at the outer end 103. It should further be appreciated that a heater assembly, thermal energy input source, or hot side heat exchanger may be positioned at the outer end 103 or the inner end 104 based at least on the positioning of the first chamber 221. It should also be appreciated that a chiller assembly, thermal energy removal source, or cold side heat exchanger may be positioned at the inner end 104 or the outer end 103 based at least on the positioning of the second chamber 222.

In still further embodiments, although certain quantities of the piston assembly 1010 are depicted in FIG. 1, various embodiments of the apparatus 100 may include three or more piston assemblies with the interconnected volume configured such as shown and described herein. Additionally, or alternatively, the plurality of piston assemblies may be arranged in V-, W-, X-, inline, radial, circular, or horizontally opposed arrangements, or other suitable arrangements including the plurality of piston assemblies and interconnected volume such as shown and described herein.

Various embodiments of the apparatus 100 shown and described herein may alternatively include connection members 1030 that are at least partially non-linear. In various embodiments, the connection member 1030 may define substantially U-, V-, S-, or other geometries. As such, various embodiments of the apparatus 100 may include two or more of the pistons 1011 in non-coaxial or non-aligned arrangement relative to one another. In still various embodiments, the piston 1011 or piston assembly 1010 may define a stepped piston or other appropriate piston or piston assembly type.

Various embodiments of the apparatus 100 shown and described herein may be fabricated via one or more manufacturing methods known in the art, such as, but not limited to, additive manufacturing, binder jetting, or 3D printing processes generally, machining processes, material addition or removal processes, or joining or bonding processes. Manufacturing processes may include, but are not limited to, casting, welding, brazing, soldering, or bonding processes. Materials may include those suitable for piston assemblies and pressure vessels configured to receive thermal differentials and operate for desired cycles and power outputs, including rigid and flexible wall members, enclosures, and conduits. Although certain exemplary embodiments may preferably be produced via one or more additive manufacturing processes, it should be appreciated that other manufacturing processes, or combinations thereof, may be utilized. Still further, although certain elements or structures may be produced as substantially monolithic structures, certain elements may be attached or otherwise coupled via welding, brazing, or mechanical fasteners, such as, but not limited to, clamps, nuts, bolts, screws, tie rods, washers, etc.

As used herein, the terms “additively manufactured” or “additive manufacturing techniques or processes” refer generally to manufacturing processes wherein successive layers of material(s) are provided on each other to “build-up,” layer-by-layer, a three-dimensional component. The successive layers generally fuse together to form a monolithic component which may have a variety of integral subcomponents.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the engine 100 provided herein without undue experimentation. For example, build features, such as trusses, grids, build surfaces, or other supporting features, or material or fluid ingress or egress ports, may be added or modified from the present geometries to facilitate manufacture of embodiments of the engine 100 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

It should be appreciated that performances, power outputs, efficiencies, or temperature differentials at the engine 100 provided herein may be based on a "Sea Level Static" or "Standard Day" input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the engine 100 receiving an input fluid, such as air, are based on Standard Day conditions.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers 221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers 221, 222, the temperature is relative to an average temperature over a phase of operation of the engine. As another example, where a substantially uniform thermal energy unit is provided or removed to/from the plurality of chambers 221, 222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine apparatus, the apparatus comprising:

a plurality of piston assemblies, wherein each piston assembly of the plurality of the piston assemblies comprises a piston attached to a connection member at a first end and a second end, and wherein each piston defines a first chamber and a second chamber separated by the piston, and wherein the first chamber and the second chamber are each defined at the first end and at the second end, and further wherein each first chamber of one piston assembly is fluidly connected to only one second chamber of a different piston assembly.

2. The apparatus of claim 1, the apparatus further comprising:

a plurality of walled conduits fluidly connecting the first chamber at one piston assembly to the second chamber of another piston assembly.

3. The apparatus of claim 1, wherein each piston assembly is mechanically separate from one another.

4. The apparatus of claim 1, further comprising:

a piston body surrounding the piston of the piston assembly.

5. The apparatus of claim 1, wherein the first chamber defines an expansion chamber and the second chamber defines a compression chamber.

6. The apparatus of claim 1, wherein the connection member of the piston assembly is extended along a lateral direction, and wherein the first end and the second end are separated along the lateral direction.

7. The apparatus of claim 1, wherein a first plurality of first chambers and a first plurality of second chambers together comprise an interconnected volume fluidly separate from a second plurality of first chambers and a second plurality of second chambers.

8. The apparatus of claim 7, wherein the piston assemblies comprise a first piston assembly, wherein the first piston assembly comprises two first chambers and two second chambers entirely within the interconnected volume.

9. The apparatus of claim 8, wherein the piston assemblies comprise a second piston assembly, wherein the second piston assembly comprises one first chamber and one second chamber entirely within the interconnected volume.

10. The apparatus of claim 9, wherein the second piston assembly comprises one first chamber and one second chamber each outside of the interconnected volume.

* * * * *